United States Patent
Wang

(10) Patent No.: US 12,111,979 B2
(45) Date of Patent: *Oct. 8, 2024

(54) GENERATING MARK INFORMATION ON A VIRTUAL OBJECT

(71) Applicant: TENCENT TECHNOLOGY (SHENZHEN) COMPANY LIMITED, Guangdong (CN)

(72) Inventor: Junxiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,531

(22) Filed: Mar. 14, 2023

(65) Prior Publication Data

US 2023/0214026 A1    Jul. 6, 2023

Related U.S. Application Data

(63) Continuation of application No. 17/333,648, filed on May 28, 2021, now Pat. No. 11,675,443, which is a
(Continued)

(30) Foreign Application Priority Data

May 30, 2019  (CN) .......................... 201910465483.5

(51) Int. Cl.
*G06F 3/01*      (2006.01)
*A63F 13/25*     (2014.01)
(Continued)

(52) U.S. Cl.
CPC ............ *G06F 3/0338* (2013.01); *A63F 13/25* (2014.09); *A63F 13/426* (2014.09);
(Continued)

(58) Field of Classification Search
CPC .... G06F 3/04815; G06F 3/017; G06F 3/0482; G06F 3/033; G06F 3/011;
(Continued)

(56) References Cited

U.S. PATENT DOCUMENTS 9,004,997 B1 *  4/2015  Prosin ................... A63F 13/837
                                                463/2
9,919,213 B2    3/2018  Dunn
(Continued)

FOREIGN PATENT DOCUMENTS

CN        108465240 A     8/2018
CN        108619721 A    10/2018
(Continued)

OTHER PUBLICATIONS

First Office Action in CN201910465483.5, mailed Mar. 16, 2021, 5 pages.
(Continued)

*Primary Examiner* — Dismery Mercedes
(74) *Attorney, Agent, or Firm* — ARENTFOX SCHIFF LLP

(57) ABSTRACT

A method for generating mark information in a virtual environment includes displaying a target-perspective picture showing the virtual environment, a sight bead pointing to an aiming position, and receiving a mark operation triggered on a mark control interface. The method further includes, in response to receiving the mark operation, generating, according to the received mark operation, mark information on a virtual object to which the aiming position points. The virtual object on which the mark information is generated is a movable object, a virtual prop, a virtual building, or a virtual landscape object in the virtual environment. The generated mark information is visible at a position of the
(Continued)

virtual object in the virtual environment to one or more teammates of the virtual character.

18 Claims, 11 Drawing Sheets

Related U.S. Application Data continuation of application No. PCT/CN2020/ 089534, filed on May 11, 2020.

(51) Int. Cl.

| | | |
|---|---|---|
| *A63F 13/426* | (2014.01) | |
| *A63F 13/428* | (2014.01) | |
| *A63F 13/52* | (2014.01) | |
| *A63F 13/525* | (2014.01) | |
| *A63F 13/533* | (2014.01) | |
| *A63F 13/537* | (2014.01) | |
| *A63F 13/5372* | (2014.01) | |
| *A63F 13/5375* | (2014.01) | |
| *A63F 13/5378* | (2014.01) | |
| *A63F 13/55* | (2014.01) | |
| *A63F 13/837* | (2014.01) | |
| *A63F 13/847* | (2014.01) | |
| *A63F 13/87* | (2014.01) | |
| *G06F 3/0338* | (2013.01) | |
| *G06F 3/0354* | (2013.01) | |
| *G06F 3/0482* | (2013.01) | |
| *G06F 3/04842* | (2022.01) | |
| *G06F 3/04847* | (2022.01) | |
| *G06T 11/60* | (2006.01) | |
| *G06T 15/00* | (2011.01) | |
| *A63F 13/5258* | (2014.01) | |
| *A63F 13/825* | (2014.01) | |

(52) U.S. Cl.
CPC ............ *A63F 13/428* (2014.09); *A63F 13/52* (2014.09); *A63F 13/525* (2014.09); *A63F 13/533* (2014.09); *A63F 13/537* (2014.09); *A63F 13/5372* (2014.09); *A63F 13/5375* (2014.09); *A63F 13/5378* (2014.09); *A63F 13/55* (2014.09); *A63F 13/837* (2014.09); *A63F 13/847* (2014.09); *A63F 13/87* (2014.09); *G06F 3/011* (2013.01); *G06F 3/03547* (2013.01); *G06F 3/0482* (2013.01); *G06F 3/04842* (2013.01); *G06F 3/04847* (2013.01); *G06T 11/60* (2013.01); *G06T 15/00* (2013.01); *A63F 13/5258* (2014.09); *A63F 13/825* (2014.09); *A63F 2300/1075* (2013.01); *A63F 2300/306* (2013.01); *A63F 2300/308* (2013.01); *A63F 2300/572* (2013.01); *A63F 2300/8082* (2013.01); *G06T 2200/24* (2013.01)

(58) Field of Classification Search
CPC ....... G06F 2203/0382; G06F 2203/013; G06F 2203/015; A63F 13/55; A63F 13/52; A63F 13/5375; A63F 13/5372; A63F 13/537; A63F 13/533; A63F 13/5378; A63F 13/56; A63F 13/58; A63F 13/87; A63F 13/798; A63F 2300/1075; A63F 2300/8076; A63F 13/426; A63F 13/837; A63F 13/5258; A63F 13/285; A63F 13/428; A63F 13/25
See application file for complete search history.

(56) References Cited

U.S. PATENT DOCUMENTS

| | | |
|---|---|---|
| 10,035,064 B2 | 7/2018 | Garvin et al. |
| 10,639,549 B2 | 5/2020 | Tang et al. |
| 11,090,563 B2 | 8/2021 | Wu |
| 11,221,726 B2* | 1/2022 | Qiu ..................... A63F 13/5372 |
| 11,376,501 B2 | 7/2022 | Fan |
| 11,471,768 B2* | 10/2022 | Chan ..................... A63F 13/822 |
| 2006/0017726 A1 | 1/2006 | Saikawa et al. |
| 2007/0010325 A1* | 1/2007 | Suzuki ............... A63F 13/5375 463/31 |
| 2007/0218966 A1* | 9/2007 | Tilston ................ A63F 13/5378 463/5 |
| 2014/0066195 A1 | 3/2014 | Matsui et al. |
| 2014/0066200 A1 | 3/2014 | Matsui et al. |
| 2014/0274239 A1* | 9/2014 | Han ..................... A63F 13/5372 463/2 |
| 2015/0258439 A1 | 9/2015 | Prosin et al. |
| 2015/0258442 A1* | 9/2015 | Yudo ..................... A63F 13/537 463/31 |
| 2017/0001112 A1* | 1/2017 | Gilmore ................ A63F 13/49 |
| 2018/0121086 A1 | 5/2018 | Wang |
| 2019/0022521 A1* | 1/2019 | Wang ..................... G06F 3/0488 |
| 2019/0076739 A1* | 3/2019 | Ge ......................... A63F 13/537 |
| 2019/0118078 A1* | 4/2019 | Li ......................... A63F 13/2145 |
| 2019/0126151 A1 | 5/2019 | Li |
| 2020/0197809 A1* | 6/2020 | Tsutsumizaki ....... A63F 13/5375 |
| 2020/0293154 A1* | 9/2020 | Qiu ......................... A63F 13/426 |
| 2021/0146248 A1* | 5/2021 | Chen ..................... A63F 13/837 |

FOREIGN PATENT DOCUMENTS

| | | |
|---|---|---|
| CN | 108671543 A | 10/2018 |
| CN | 109806585 A | 5/2019 |
| CN | 110115838 A | 8/2019 |
| JP | 2010207404 A | 9/2010 |
| JP | 2015022583 A | 2/2015 |
| JP | 5945297 B2 | 7/2016 |
| KR | 1020060018925 A | 3/2006 |

OTHER PUBLICATIONS

"How to Set a Mark in Apex Legends," Minguang Phantom Game Commentary, Feb. 13, 2019, Baidu, Retrieved from the Internet: <https://jingyan.baidu.com/article/eb9f7b6d3bfc7a869264e85a. html>, 3 pages.
International Search Report and Written Opinion in PCT/CN2020/ 089534, mailed Aug. 10, 2020, 11 pages.
Office Action and Search Report in SG11202108773V, mailed Jan. 4, 2023, 10 pages.
"Third Person Aim Down Sights," Nexusmods, Sep. 19, 2017, Retrieved from the Internet: <https://www.nexusmods.com/fallout4/ mods/26585/>, 4 pages.
Office Action in KR1020217022716, mailed Mar. 14, 2023, 5 pages.

\* cited by examiner

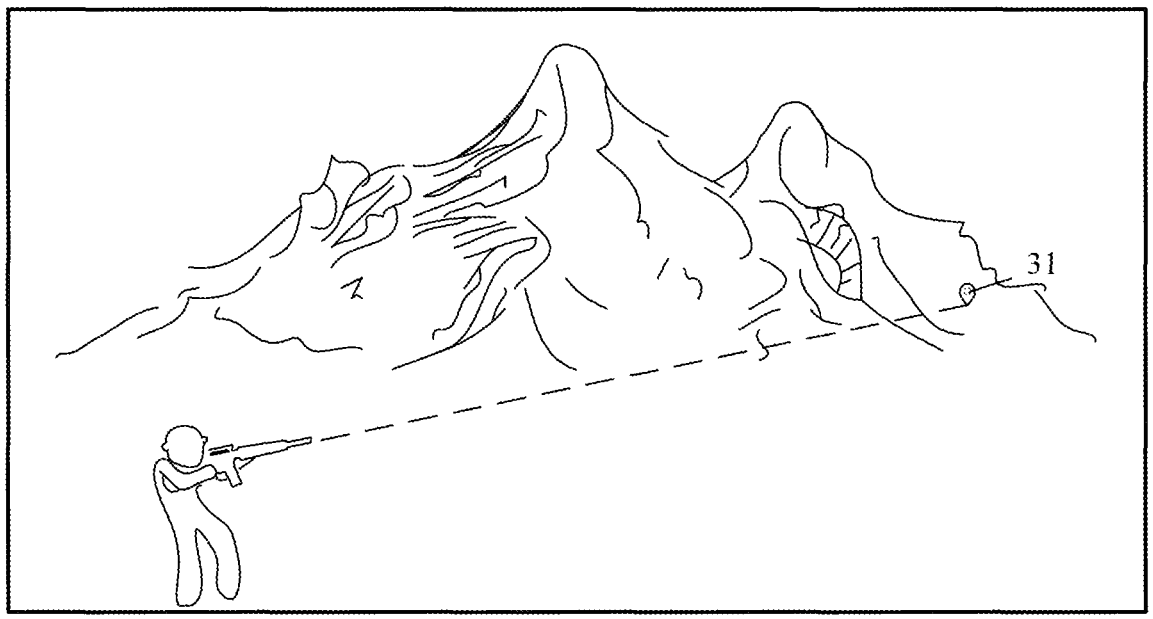

FIG. 5

```
┌─────────────────────────────────────────────────────────────┐
│ Superimpose and display a roulette option list on the target-│── 301
│ perspective picture in a case that a joystick control receives a slide │
│                         operation                            │
└─────────────────────────────────────────────────────────────┘
                              ↓
┌─────────────────────────────────────────────────────────────┐
│ Cancel generation of the mark information in a case that an end │── 302
│     position of the slide operation is in a central region   │
└─────────────────────────────────────────────────────────────┘
```

FIG. 6

GENERATING MARK INFORMATION ON A VIRTUAL OBJECT

RELATED APPLICATIONS

This application is a continuation of U.S. application Ser. No. 17/333,648, filed on May 28, 2021, which is a continuation of International Application No. PCT/CN2020/089534, filed on May 11, 2020, which claims priority to Chinese Patent Application No. 201910465483.5, entitled "METHOD AND APPARATUS FOR GENERATING MARK INFORMATION IN VIRTUAL ENVIRONMENT, DEVICE, AND STORAGE MEDIUM" and filed on May 30, 2019. The entire disclosures of the prior applications are hereby incorporated by reference in their entirety.

FIELD OF THE TECHNOLOGY

This application relates to the field of computer technologies, including a method and an apparatus for generating mark information in a virtual environment, an electronic device, and a storage medium.

BACKGROUND OF THE DISCLOSURE

In an application based on a virtual environment, a user can control a virtual character to run, walk, jump, fight, and the like in the virtual environment. In some scenes, the user controls the virtual character to mark a virtual object in the virtual environment, for example, inserting a little red flag at a geographic location, to prompt a teammate to go to the geographic location.

In the related art, a method for generating mark information is provided as follows. An environment picture of a virtual environment is displayed on an application, and a map thumbnail is displayed on the upper right corner of the environment picture. When needing to mark a geographic location on the map, a user first opens the map thumbnail by tapping. The application displays the map thumbnail in a zoom-in manner, and then the user taps a geographic location on the zoomed-in map thumbnail. The application generates mark information on the geographic location according to the tap of the user.

In the foregoing related process, the user needs to first open the map thumbnail and then performs marking, and the zoomed-in map thumbnail interrupts other operations of the virtual character by the user, such movement or fighting.

SUMMARY

According to various embodiments of this application, a method and an apparatus for generating mark information in a virtual environment, an electronic device, and a storage medium are provided.

In an embodiment, a method for generating mark information in a virtual environment, the method includes displaying a target-perspective picture showing the virtual environment including a virtual character from a perspective, a sight bead and a mark control interface being displayed in the target-perspective picture. The method also includes receiving a first-perspective switching operation, and changing an observation direction of the target-perspective picture and an aiming position of the sight bead according to the first-perspective switching operation. The method further includes receiving a mark operation triggered on the mark control interface, and generating, by processing circuitry of an electronic device, according to the mark operation, mark information on a virtual object to which the aiming position points.

In an embodiment, an apparatus for generating mark information in a virtual environment includes processing circuitry configured to control display of a target-perspective picture showing the virtual environment including a virtual character from a perspective, a sight bead and a mark control interface being displayed in the target-perspective picture. The processing circuitry is also configured to receive a first-perspective switching operation, and change an observation direction of the target-perspective picture and an aiming position of the sight bead according to the first-perspective switching operation. The processing circuitry is further configured to receive a mark operation triggered on the mark control interface, and generate, according to the mark operation, mark information on a virtual object to which the aiming position points.

In an embodiment, a computer-readable storage medium, storing instructions, which, when executed by a processor, cause the processor to perform displaying a target-perspective picture showing a virtual environment including a virtual character from a perspective, a sight bead and a mark control interface being displayed in the target-perspective picture. The instructions also cause the processor to perform receiving a first-perspective switching operation, and changing an observation direction of the target-perspective picture and an aiming position of the sight bead according to the first-perspective switching operation. The instructions further cause the processor to perform receiving a mark operation triggered on the mark control interface, and generating, according to the mark operation, mark information on a virtual object to which the aiming position points.

Details of one or more embodiments of this application are provided in the subsequent accompanying drawings and descriptions. Other features and advantages of this application become obvious with reference to the specification, the accompanying drawings, and the claims.

BRIEF DESCRIPTION OF THE DRAWINGS

To describe technical solutions in embodiments of this application more clearly, the following briefly introduces the accompanying drawings describing the embodiments. The accompanying drawings in the following description show exemplary embodiments of this application, and a person of ordinary skill in the art may still derive other drawings from these accompanying drawings.

FIG. 5 is a schematic diagram of an interface of generating mark information in a virtual environment according to another exemplary embodiment of this application.

FIG. 6 is a flowchart of a method for generating mark information in a virtual environment according to another exemplary embodiment of this application.

DESCRIPTION OF EMBODIMENTS

Figure 1:
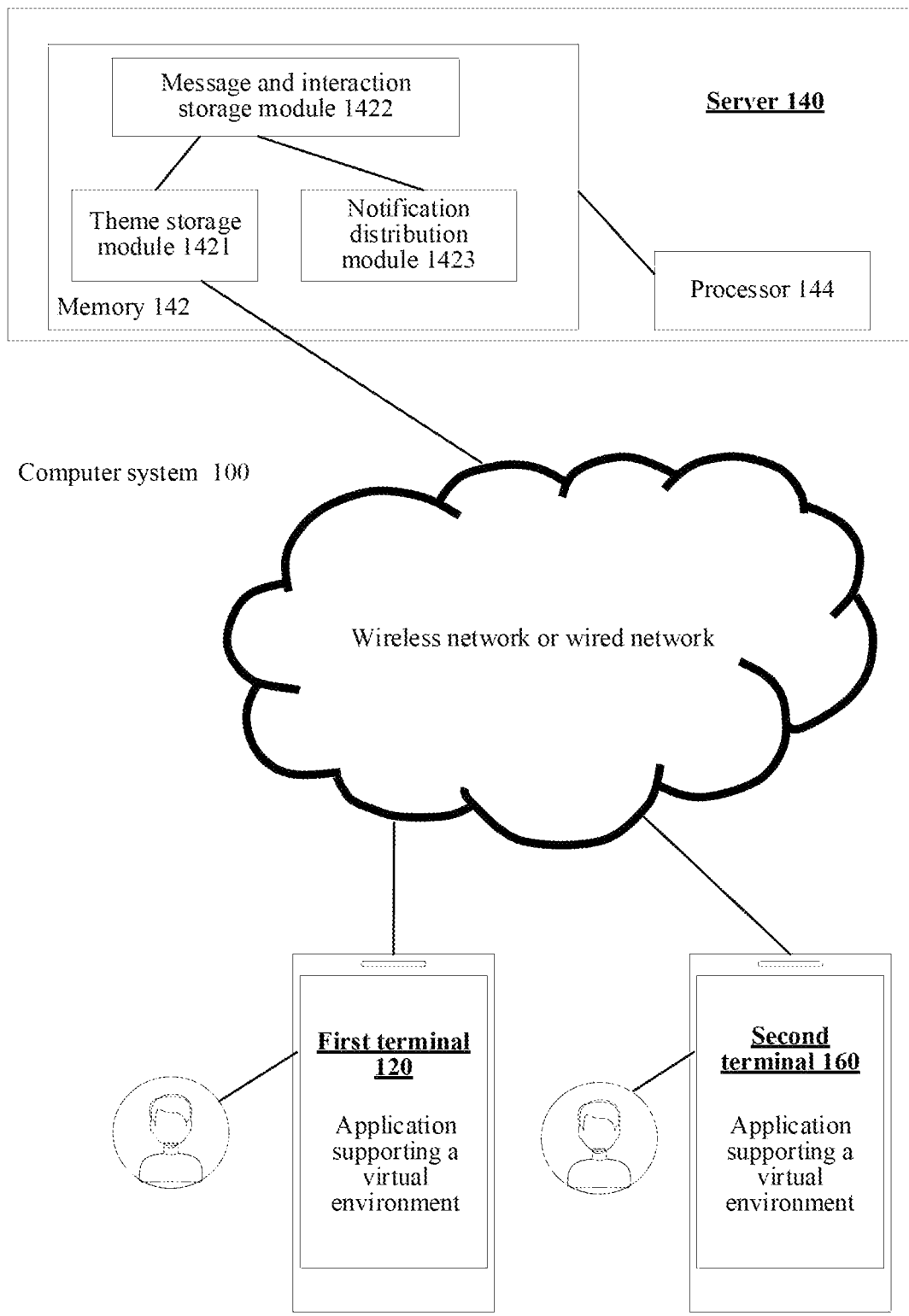
FIG. 1 is a schematic structural diagram of a computer system according to an exemplary embodiment of this application.

To make objectives, technical solutions, and advantages of this application clearer, the following further describes implementations of this application in detail with reference to the accompanying drawings. It is to be understood that the specific embodiments described herein are merely used for explaining this application but are not intended to limit this application.

First, the following explains several terms involved in the embodiments of this application.

Virtual environment: a virtual environment that is displayed (or provided) by an application when run on an electronic device (such as a terminal). The virtual environment may be a simulated environment of a real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. A description is made by using an example in which the virtual environment is a 3D virtual environment in the following embodiments, but this is not limited.

Virtual character: a movable object in a virtual environment. The movable object may be at least one of a virtual person, a virtual animal, and a cartoon person. Optionally, in a case that the virtual environment is a 3D virtual environment, the virtual character is a 3D model created based on skeletal animation technology. Each virtual character has a shape and size in the 3D virtual environment, and occupies some space in the 3D virtual environment.

Virtual object: an object displayed in the virtual environment. The object may be a movable object, for example, a virtual animal or a movable target; or may be an unmovable object, for example, a virtual building or a virtual hill. Optionally, the virtual object may be a 3D model. Each virtual object has a shape and size in the 3D virtual environment, and occupies some space in the 3D virtual environment.

Perspective: an observation angle for observation from a first-person perspective or a third-person perspective of a virtual character in a virtual environment. Optionally, in the embodiments of this application, the perspective is an angle for observing the virtual character by using a camera model in the virtual environment.

Optionally, the camera model automatically follows the virtual character in the virtual environment. That is, when a position of the virtual character in the virtual environment changes, a position of the camera model following the virtual character in the virtual environment changes simultaneously, and the camera model may be within a preset distance range from the virtual character in the virtual environment. Optionally, in the automatic following process, relative positions of the camera model and the virtual character remain unchanged.

A sight bead is set on a virtual picture within a perspective range. The sight bead is used as a reference for perspective rotation. Optionally, the sight bead is on the central axis of the perspective.

Camera model: a 3D model located around a virtual character in a 3D virtual environment. When a first-person perspective is adopted, the camera model is located near the head of the virtual character or at the head of the virtual character. When a third-person perspective is adopted, the camera model may be located behind the virtual character and bound to the virtual character, or may be located at any position at a preset distance from the virtual character. The virtual character located in the 3D virtual environment may be observed from different angles through the camera model. Optionally, when the third-person perspective is a first-person over-shoulder perspective, the camera model is located behind the virtual character (for example, the head and the shoulders of a virtual person). Optionally, in addition to the first-person perspective and the third-person perspective, the perspective also includes other perspectives, such as a top perspective. When the top perspective is used, the camera model may be located above the head of the virtual character. The top perspective is a perspective for observing the virtual environment at an angle from the air. Optionally, the camera model is not actually displayed in the 3D virtual environment. In other words, the camera model is not displayed in the 3D virtual environment displayed in a user interface (UI).

The first-person perspective or the third-person perspective may be adopted for implementation of a method for generating mark information in a virtual environment provided in this application. The method is applicable to a computer system shown in FIG. 1. The computer system 100 includes a first terminal 120, a server 140, and a second terminal 160.

An application supporting a virtual environment is installed and run on the first terminal 120. The application 14 may be any one of a virtual reality application, a 3D map program, a military simulation program, a third-person shooter (TPS) game, a first-person shooter (FPS) game, a multiplayer online battle arena (MOBA) game, a multiplayer gunfight survival game, and a battle royale shooting game. Optionally, the application 14 may be a standalone application, such as a standalone 3D game program, or may be a network online application. The first terminal 120 is a terminal used by a first user, and the first user uses the first terminal 120 to control a first virtual character in the virtual environment to perform a movement. The movement includes, but is not limited to, at least one of body posture adjustment, crawling, walking, running, cycling, jumping, driving, picking-up, shooting, attacking, and throwing. For example, the first virtual character is a first virtual person, such as a simulated person role or a cartoon person role.

The first terminal 120 is connected to the server 140 by using a wireless network or a wired network.

The server 140 includes at least one of one server, a plurality of servers, a cloud computing platform, and a virtualization center. For example, the server 140 includes a processor (processing circuitry) 144 and a memory 142 (non-transitory computer-readable memory). The memory 142 includes a theme storage module 1421, a message and interaction storage module 1422, and a notification distribution module 1423. The server 140 is configured to provide a backend service for an application supporting a 3D virtual environment. Optionally, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application supporting a virtual environment is installed and run on the second terminal 160. The application may be any one of a virtual reality application, a 3D map program, a military simulation program, a TPS game, an FPS game, a MOBA game, a multiplayer gunfight survival game, and a battle royale shooting game. The second terminal 160 is a terminal used by a second user, and the second user uses the second terminal 160 to control a second virtual character in the virtual environment to perform a movement. The movement includes, but is not limited to, at least one of body posture adjustment, crawling, walking, running, cycling, jumping, driving, picking-up, shooting, attacking, and throwing. For example, the second virtual character is a second virtual person, such as a simulated person role or a cartoon person role.

Optionally, the first virtual character and the second virtual character are located in the same virtual environment. Optionally, the first virtual character and the second virtual character may belong to the same team or the same organization, have a friend relationship, or have temporary communication permission.

Optionally, the applications installed on the first terminal 120 and the second terminal 160 are the same, or the applications installed on the two terminals are the same type of applications in different control system platforms. The first terminal 120 may be generally one of a plurality of terminals, and the second terminal 160 may be generally one of a plurality of terminals. In this embodiment, only the first terminal 120 and the second terminal 160 are used as an example for description. The first terminal 120 and the second terminal 160 are of the same or different device types. The device type includes at least one of a smartphone, a tablet computer, an e-book reader, an MP3 player, an MP4 player, a laptop, and a desktop computer. The following embodiment is described by using an example that the terminal includes a smartphone.

A person skilled in the art may understand that there may be more or fewer terminals. For example, there may be only one terminal, or there may be dozens or hundreds or more terminals. The quantity and the device type of the terminals are not limited in the embodiments of this application.

Figure 2:
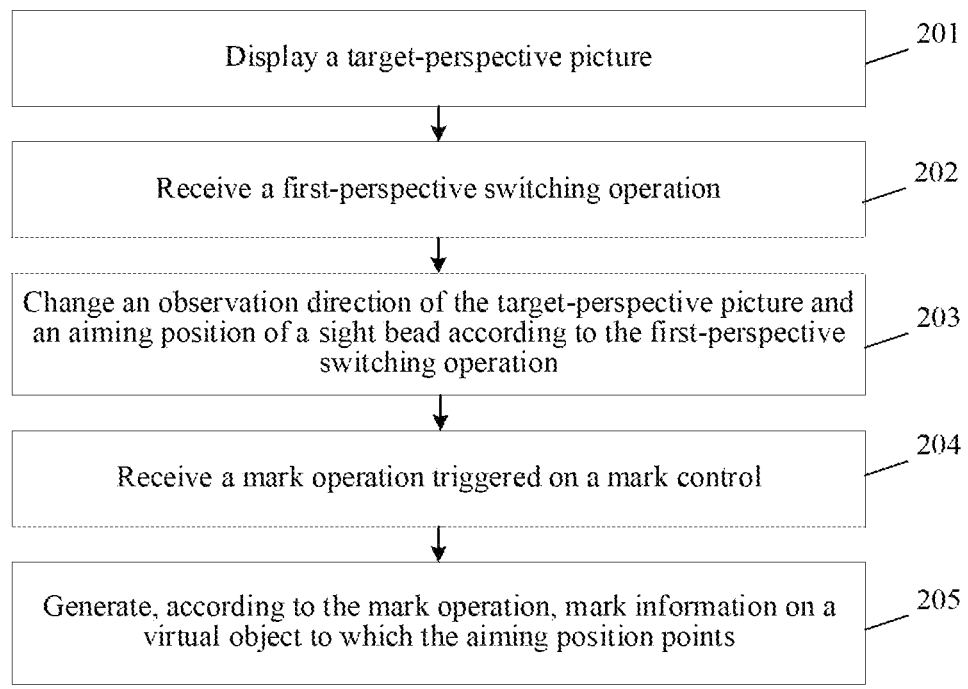
FIG. 2 is a flowchart of a method for generating mark information in a virtual environment according to an exemplary embodiment of this application.

FIG. 2 is a flowchart of a method for generating mark information in a virtual environment according to an exemplary embodiment. The method is applicable to an electronic device. The electronic device may be a terminal or server shown in FIG. 1, and a description is made by using an example in which the method is applied to the terminal shown in FIG. 1. The method includes the following steps:

In step 201, a terminal displays a target-perspective picture.

In an embodiment, the terminal displays a target-perspective picture of an application. The application may be at least one of a virtual reality application, a 3D map application, a military simulation program, a TPS game, an FPS game, and a MOBA game.

The target-perspective picture is a picture obtained by observing the virtual environment including a virtual character from a target perspective. Optionally, the target perspective is a perspective for observing the virtual environment from a first-person perspective of the virtual character, or the target perspective is a perspective for observing the virtual environment from a third-person perspective of the virtual character.

A sight bead and a mark control are displayed in the target-perspective picture.

The sight bead is used as a reference for the perspective. Optionally, the sight bead is displayed in a middle position of the target-perspective picture. In this embodiment, the sight bead is used for position aiming.

Figure 3:
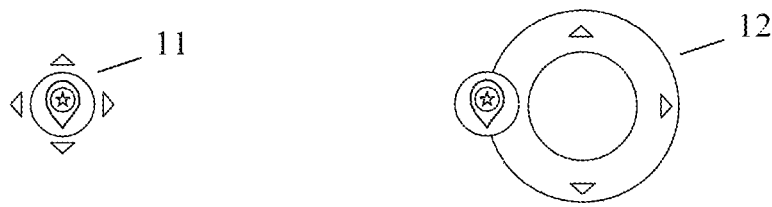
FIG. 3 is a schematic structural diagram of a joystick control according to an exemplary embodiment of this application.

The mark control (mark control interface) is configured to trigger generation of mark information on a virtual object to which an aiming position points. Optionally, the mark control is a button control or a joystick control (joystick control interface). For example, FIG. 3 shows a joystick control, where the left part of the figure shows a joystick control 11 when no operation is triggered, and the right part of the figure shows a joystick control 12 when a drag operation is triggered.

Optionally, the mark information includes at least one of a warning mark, a material mark, a go-forward mark, an attack mark, a retreat mark, a defense mark, a caution mark, and a neutral mark.

The warning mark is used for prompting the virtual character to take warning measures, or prompting the virtual character to take warning measures for a marked position. The material mark is used for prompting the virtual character that there is a material in the marked position. The go-forward mark is used for prompting the virtual character to go forward to the marked position, or setting the virtual character to automatically go forward to the marked position; the attack mark is used for prompting the virtual character to start attacking, or prompting the virtual character to attack toward the marked position.

The retreat mark is used for prompting the virtual character to start retreating, or prompting the virtual character to retreat toward the marked position. The defense mark is used for prompting the virtual character to be in defense. The caution mark is used for prompting the virtual character that it is dangerous in the marked position, or prompting the virtual character that there is an enemy in the marked position. The neutral mark is used as a prompt mark, and can indicate agreed content to a user.

Optionally, a perspective switching control is further superimposed and displayed on the target-perspective picture. The perspective switching control is configured to control switching of the perspective of the virtual character, and is further configured to change an aiming position of the sight bead.

In step 202, the terminal receives a first-perspective switching operation.

The terminal includes a touch screen, and receives a first-perspective switching operation triggered by the user in a screen region corresponding to the perspective switching control. The first-perspective switching operation is used for changing an observation direction of the target-perspective picture and the aiming position of the sight bead.

In step 203, the terminal changes an observation direction of the target-perspective picture and an aiming position of a sight bead according to the first-perspective switching operation.

The terminal changes the perspective of the virtual character according to the first-perspective switching operation, to change the observation direction of the target-perspective picture and the aiming position of the sight bead. The change of the aiming position of the sight bead is used for determining a position of the virtual object.

In step 204, the terminal receives a mark operation triggered on a mark control.

The terminal receives a mark operation triggered by the user in a screen region corresponding to the mark control. The mark operation is used for triggering generation of mark information on the virtual object to which the aiming position points.

Optionally, when the mark control is a button control, the mark operation may be any one of a tap operation, a double-tap operation, and a multi-tap operation.

Optionally, when the mark control is a joystick control, the mark operation may be at least one of a tap operation and a slide operation.

In step 205, the terminal generates, according to the mark operation, mark information on a virtual object to which the aiming position points.

The terminal determines the virtual object in a pointing direction of the aiming position, and generates mark information on the virtual object.

Optionally, when the mark control is a button control, the terminal generates, according to the mark operation, the mark information on the virtual object to which the aiming position points.

Optionally, when the mark control is a joystick control, the mark operation includes a slide operation acting on the joystick control; and generation of the mark information includes the following schematic steps.

(1) The terminal superimposes and displays a roulette option list on the target-perspective picture in response to a determination that the joystick control receives the slide operation.

The roulette option list includes at least two candidate mark types arranged along a roulette edge. Optionally, the at least two candidate mark types include at least two of the following types: a warning mark, a material mark, a go-forward mark, an attack mark, a retreat mark, a defense mark, a caution mark, and a neutral mark.

(2) The terminal determines a target mark type from the at least two candidate mark types according to an end position of the slide operation.

Optionally, a slide region of the joystick control includes a roulette region, and the roulette region is divided into M subregions, a candidate mark type being correspondingly set in each of the M subregions. The terminal determines that a subregion in which the end position of the slide operation is located is an $i^{th}$ subregion, and determines an $i^{th}$ candidate mark type corresponding to the $i^{th}$ subregion as the target mark type, M being a positive integer greater than 1, i being a positive integer less than or equal to M.

For example, the slide region of the joystick control includes a subregion 1, a subregion 2, a subregion 3, and a subregion 4. A mapping relationship between the subregions and candidate mark types is shown in Table 1. An attack mark is correspondingly set in the subregion 1, a retreat mark is correspondingly set in the subregion 2, a defense mark is correspondingly set in the subregion 3, and a caution mark is correspondingly set in the subregion 4.

When the end position of the slide operation is located in the subregion 1, the target mark type is the attack mark. When the end position of the slide operation is located in the subregion 2, the target mark type is the retreat mark. When the end position of the slide operation is located in the subregion 3, the target mark type is the defense mark. When the end position of the slide operation is located in the subregion 4, the target mark type is the caution mark.

TABLE 1

| Subregion | Candidate mark type | List item |
|---|---|---|
| 1 | Attack mark | 1 |
| 2 | Retreat mark | 2 |
| 3 | Defense mark | 3 |
| 4 | Caution mark | 4 |

The M subregions respectively correspond to M list items in the roulette option list. The terminal displays the M candidate mark types in the M corresponding list items respectively. In other words, the $i^{th}$ subregion corresponds to an $i^{th}$ list item, and when triggering a slide operation of the joystick control, the terminal displays the candidate mark type corresponding to the $i^{th}$ subregion in the $i^{th}$ list item. For example, as shown in Table 1, when triggering a slide operation of the joystick control, the terminal displays the attack mark corresponding to the subregion 1 in a list item 1, displays the retreat mark corresponding to the subregion 2 in a list item 2, displays the defense mark corresponding to the subregion 3 in a list item 3, and displays the caution mark corresponding to the subregion 4 in a list item 4.

(3) Generate the mark information corresponding to the target mark type on the virtual object to which the aiming position points.

Optionally, the terminal projects a ray in a forward direction from the aiming position, and determines an intersection position between the ray and a map scene or the virtual object in the virtual environment. The terminal then generates the mark information corresponding to the target mark type on the intersection position. The ray is not visible in the virtual environment; or the ray is a fully or partially visible ray in the virtual environment.

Figure 4:
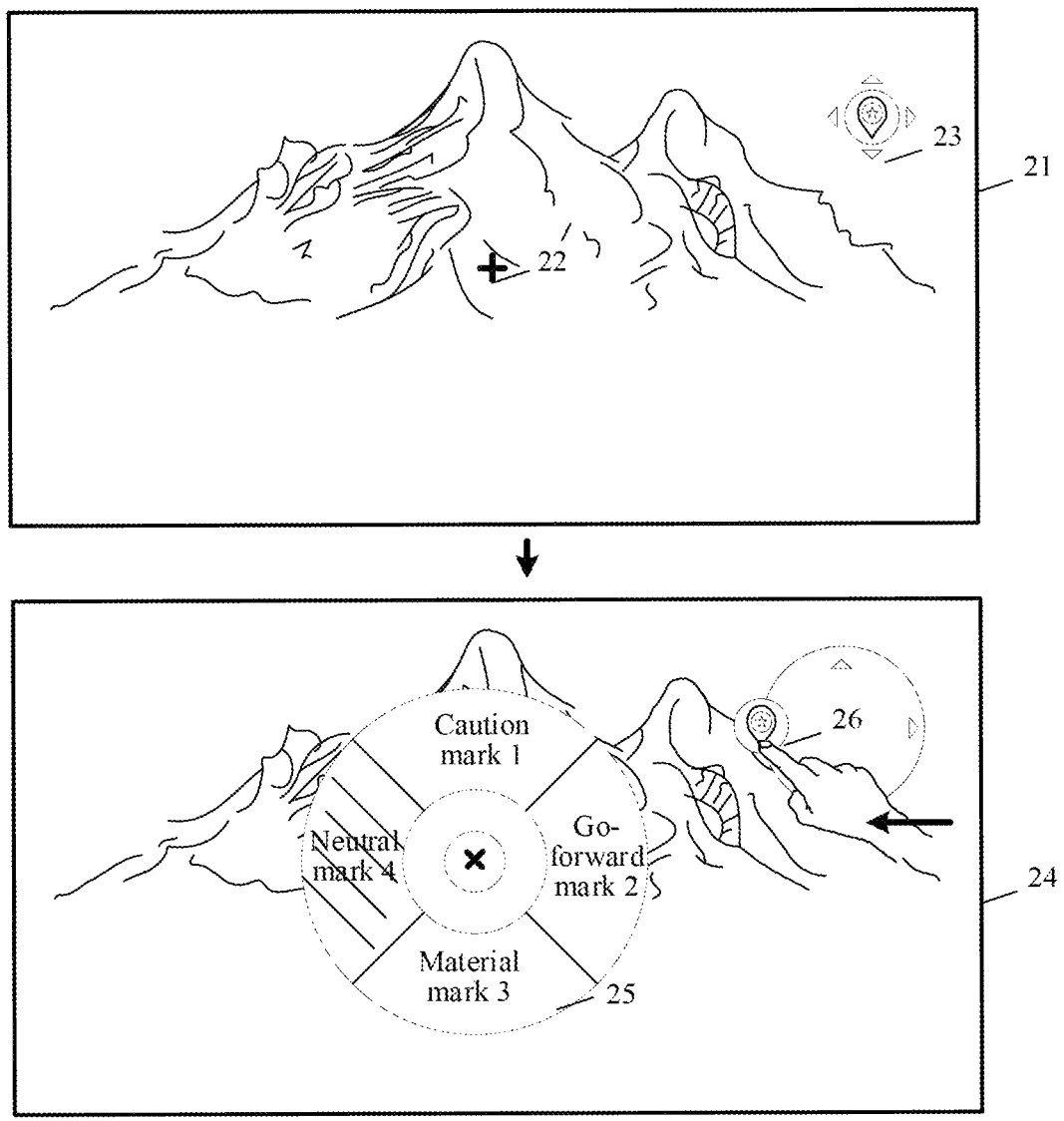
FIG. 4 is a schematic diagram of an interface of generating mark information in a virtual environment according to an exemplary embodiment of this application.

For example, the mark control is a joystick control. As shown in FIG. 4, a sight bead 22 and a joystick control 23 are displayed in a target-perspective picture 21. The terminal receives a slide operation on the joystick control 23, and superimposes and displays a roulette option list 25 on a target-perspective picture 24, the roulette option list 25 including four candidate mark types arranged along a roulette edge, which are a caution mark 1, a go-forward mark 2, a material mark 3, and a neutral mark 4 respectively. When an end position of the slide operation is a position 26 shown in the target-perspective picture 24, the target mark type corresponds to the neutral mark 4 (a shaded part in the figure) in the roulette option list 25. The terminal projects a ray in a forward direction of the aiming position, and determines an intersection position 31 with a map scene in the virtual environment. As shown in FIG. 5, the neutral mark 4 is displayed on the intersection position 31.

Optionally, when the mark control is a joystick control, the mark operation includes a tap operation acting on the joystick control; and when receiving the tap operation on the joystick control, the terminal generates mark information on the virtual object to which the aiming position points.

Mark information of the corresponding different mark types in the roulette option list may be set by the user, or may be default in the application. The mark information generated by triggering of the tap operation may also set by the user, or be default in the application. For example, assuming that settings in Table 1 are default in the application, the user may set mark information corresponding to the subregion 1 to a material mark, and then the material mark is correspondingly displayed in the list item 1. It is assumed that when a tap operation is triggered on the joystick control, the terminal generates a neutral mark by default, and the user can change the setting, to set mark information corresponding to a tap operation to a go-forward mark, so that when a tap operation is triggered on the joystick control, the terminal generates a go-forward mark.

Based on the above, by means of the method for generating mark information in a virtual environment provided in this embodiment, a target-perspective picture of an application is displayed on a terminal, a sight bead and a mark control being displayed in the target-perspective picture; and the terminal receives a first-perspective switching operation, changes an observation direction of the target-perspective picture and an aiming position of the sight bead according to the first-perspective switching operation, receives a mark operation triggered on the mark control, and generates, according to the mark operation, mark information on a virtual object to which the aiming position points.

The method can enable the terminal to generate the mark information on the virtual object without interrupting other operations of a virtual character, thereby improving human-computer interaction efficiency. In addition, by means of the method, a position of the virtual object is determined by using a ray emitted by the sight bead, so that marking on the virtual object is more accurate, and a long-distance virtual object can also be accurately marked. In addition, by means of the method, one joystick control can be used to trigger marking of mark information of at least two mark types, so that it is unnecessary to set a plurality of mark controls, to avoid affecting control operations on a screen and avoid increasing an erroneous touch rate. It is unnecessary to unfold an option list to select a mark type of mark information, thereby implementing quick marking of mark information of different mark types, and improving human-computer interaction efficiency.

Based on FIG. 2, after the user triggers the mark operation, the mark operation may be cancelled. As shown in FIG. 6, an example in which the mark control is a joystick control, and the mark operation includes a slide operation acting on the joystick control is used. The method for generating mark information in a virtual environment may further include the following steps:

In step 301, a roulette option list is superimposed and displayed on the target-perspective picture in response to a determination that the joystick control receives the slide operation.

The roulette option list includes at least two candidate mark types arranged along a roulette edge and a central region.

In step 302, generation of the mark information is canceled in response to a determination that an end position of the slide operation is in the central region.

Optionally, an operation region corresponding to the joystick control is divided into a roulette region and a central region, for example, two concentric circles, including an inner circle and an outer circle, a region included in the inner circle being the central region, a region out of the inner circle and inside the outer circle being the roulette region. In a case that an end position of the slide operation is in the central region, the terminal cancels generation of the mark information.

Figure 7:
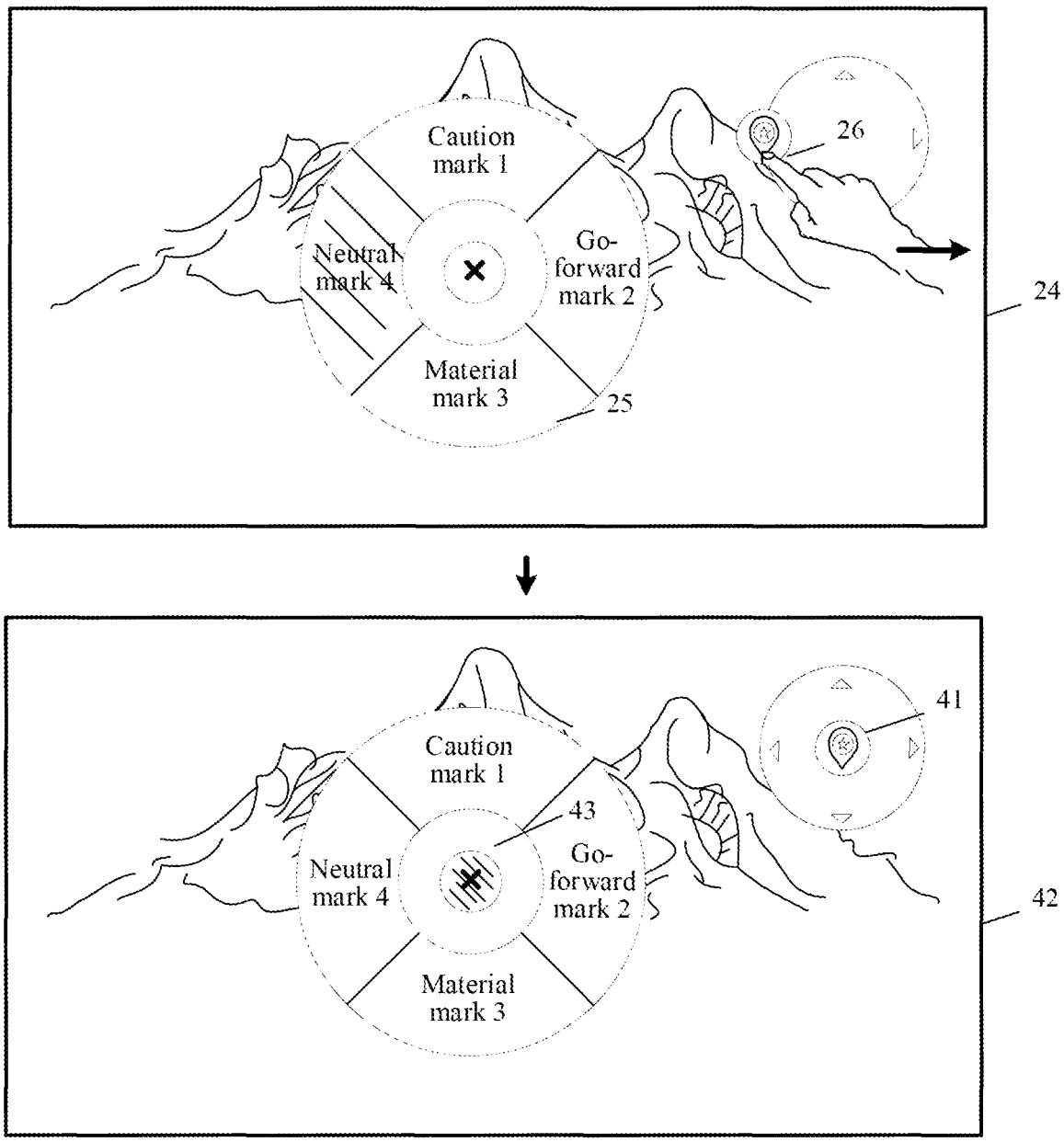
FIG. 7 is a schematic diagram of an interface of generating mark information in a virtual environment according to another exemplary embodiment of this application.

For example, as shown in FIG. 7, in the target-perspective picture 24, the position 26 at which a joystick is located is in the roulette region, and a corresponding mark type in the roulette option list is the neutral mark 4. When the slide operation ends in the position 26, mark information generated correspondingly is the neutral mark 4. Before the slide operation ends, the joystick is slid to a position 41. As shown in a target-perspective picture 42 in the figure, the position 41 is located in the central region, and when the slide operation ends in the position 41, generation of the mark information is cancelled. A cancel mark 43 is further displayed in a central position of the roulette option list.

Based on the above, according to the method for generating mark information in a virtual environment provided in this embodiment, after the operation of triggering generation of the mark information, generation of the mark information can be cancelled, so that an erroneous operation can be cancelled in time after being triggered by the user, thereby improving user operation experience.

In addition, the method resolves a problem that mark information can only be used for marking geographic locations on a map, and cannot be used for marking in other dimensions, so that the terminal can mark virtual objects such as virtual props in the virtual environment.

Figure 8:
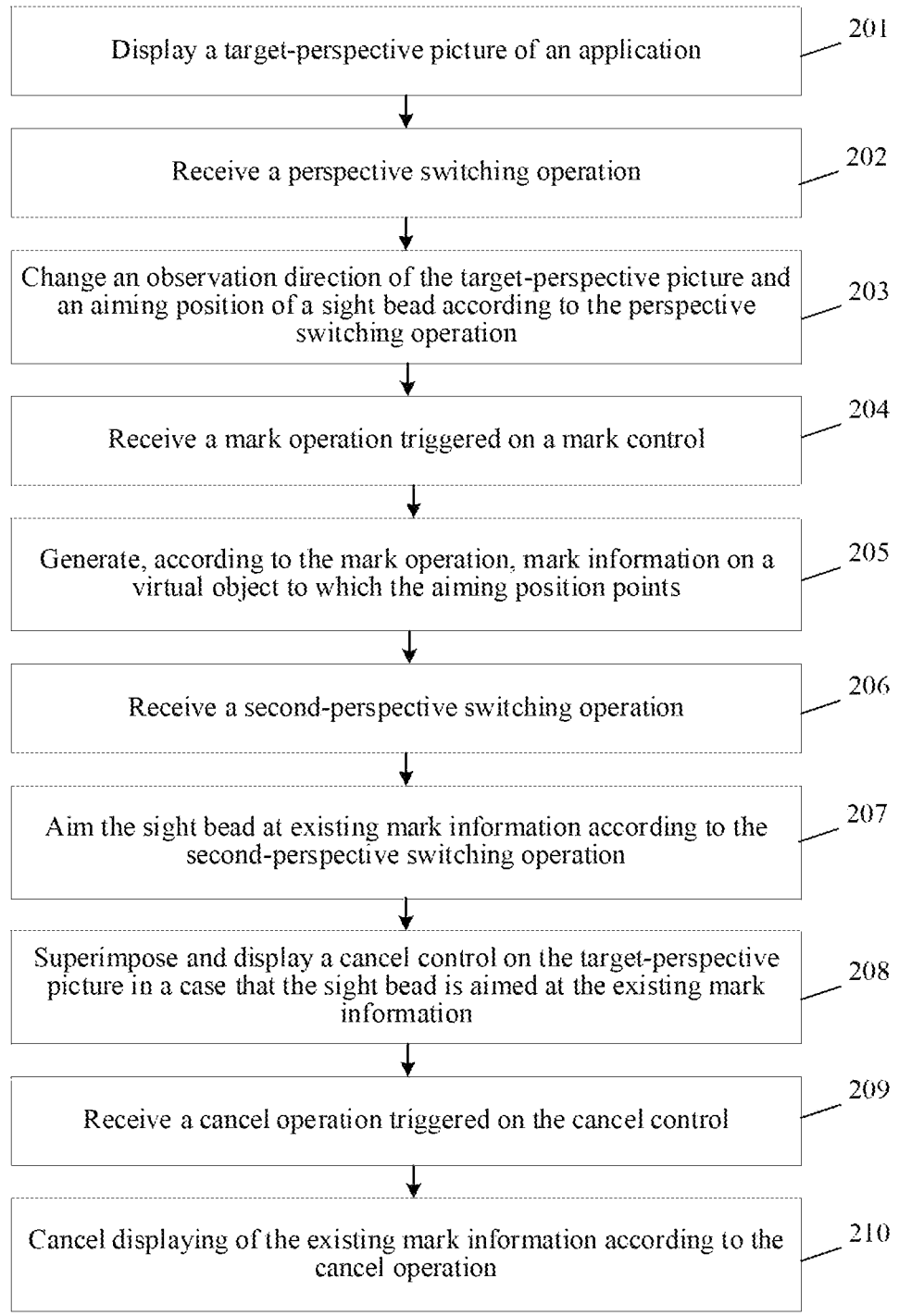
FIG. 8 is a flowchart of a method for generating mark information in a virtual environment according to another exemplary embodiment of this application.

The mark information may be cancelled after an operation of generating mark information is triggered, and may alternatively be cancelled after the mark information is successfully generated. Based on FIG. 2, step 206 to step 210 are added after step 205. As shown in FIG. 8, schematic steps are as follows:

In step 206, a second-perspective switching operation is received.

The second-perspective switching operation may further be used for aiming the sight bead at existing mark information.

In step 207, the sight bead is aimed at existing mark information according to the second-perspective switching operation.

Optionally, schematic steps of aiming the sight bead at existing mark information by the terminal may as be follows. (1) The terminal adjusts the aiming position of the sight bead according to the second-perspective switching operation. (2) The terminal calculates a first distance between the aiming position and a marked position of the existing mark information. (3) The terminal determines whether the first distance is less than a first distance threshold; and, in response to a determination that the first distance is less than the first distance threshold, the terminal performs step 208; otherwise, the terminal performs step (1).

In step 208, a cancel control (cancel control interface) is superimposed and displayed on the target-perspective picture in response to a determination that the sight bead is aimed at the existing mark information.

The cancel control is configured to cancel marking of the mark information. Optionally, the cancel control is a button control.

Optionally, in response to a determination that the first distance between the aiming position of the sight bead and the marked position of the existing mark information is less than the first distance threshold, the terminal displays a cancel control on the target-perspective picture.

Optionally, in response to a determination that the virtual character has a teammate, the existing mark information may be mark information marked by the virtual character or mark information marked by the teammate.

In step 209, a cancel operation triggered on the cancel control is received.

Optionally, in response to a determination that the cancel control is a button control, the cancel operation may be a tap operation on the cancel control; and the terminal receives the tap operation on a screen region corresponding to the button control.

In step 210, displaying of the existing mark information is canceled according to the cancel operation.

Figure 9:
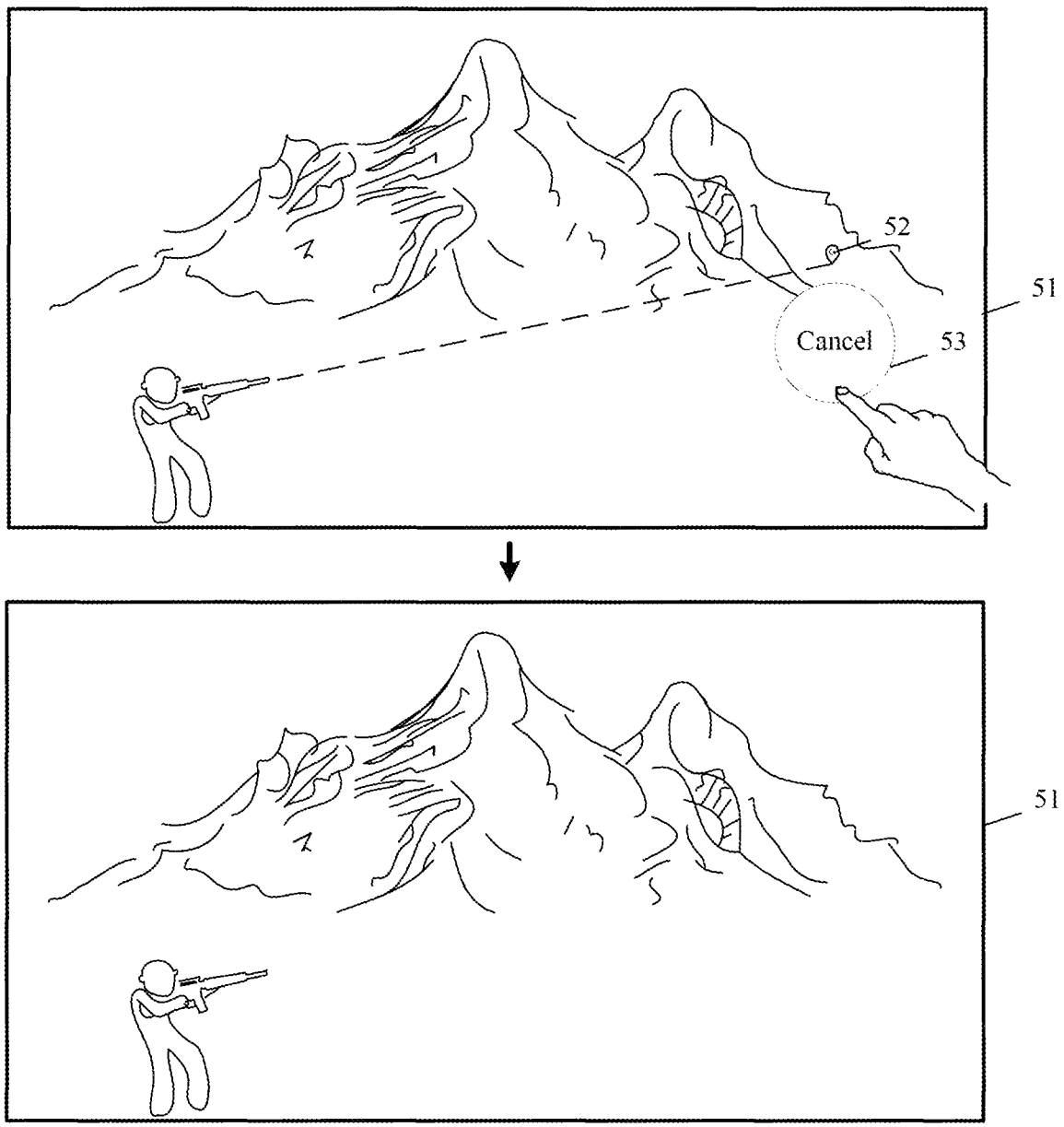
FIG. 9 is a schematic diagram of an interface of generating mark information in a virtual environment according to another exemplary embodiment of this application.

For example, as shown in FIG. 9, when the sight bead is aimed at a marked position 52 of the mark information, a cancel button 53 is displayed on a target perspective interface 51, as shown in the upper part of the figure. The terminal receives a tap operation on the cancel button 53, and the mark information is no longer displayed on the marked position 52 in the target perspective interface 51, as shown in the lower part of the figure.

In response to a determination that the existing mark information is marked by a teammate of the virtual character, when the cancel control is displayed on the target-perspective picture, a response control (response control interface) may further be displayed, the response control being configured to respond to the mark information of the teammate. For example, when the mark information marked by the teammate of the virtual character is an attack mark, the virtual character responds to the mark information by using the response control, to inform the teammate that the user controlling the virtual character has received an attack message.

Based on the above, according to the method for generating mark information in a virtual environment provided in this embodiment, mark information can be cancelled after being generated, so that the user can cancel marking of the mark information at any time, thereby improving the user operation experience.

Figure 10:
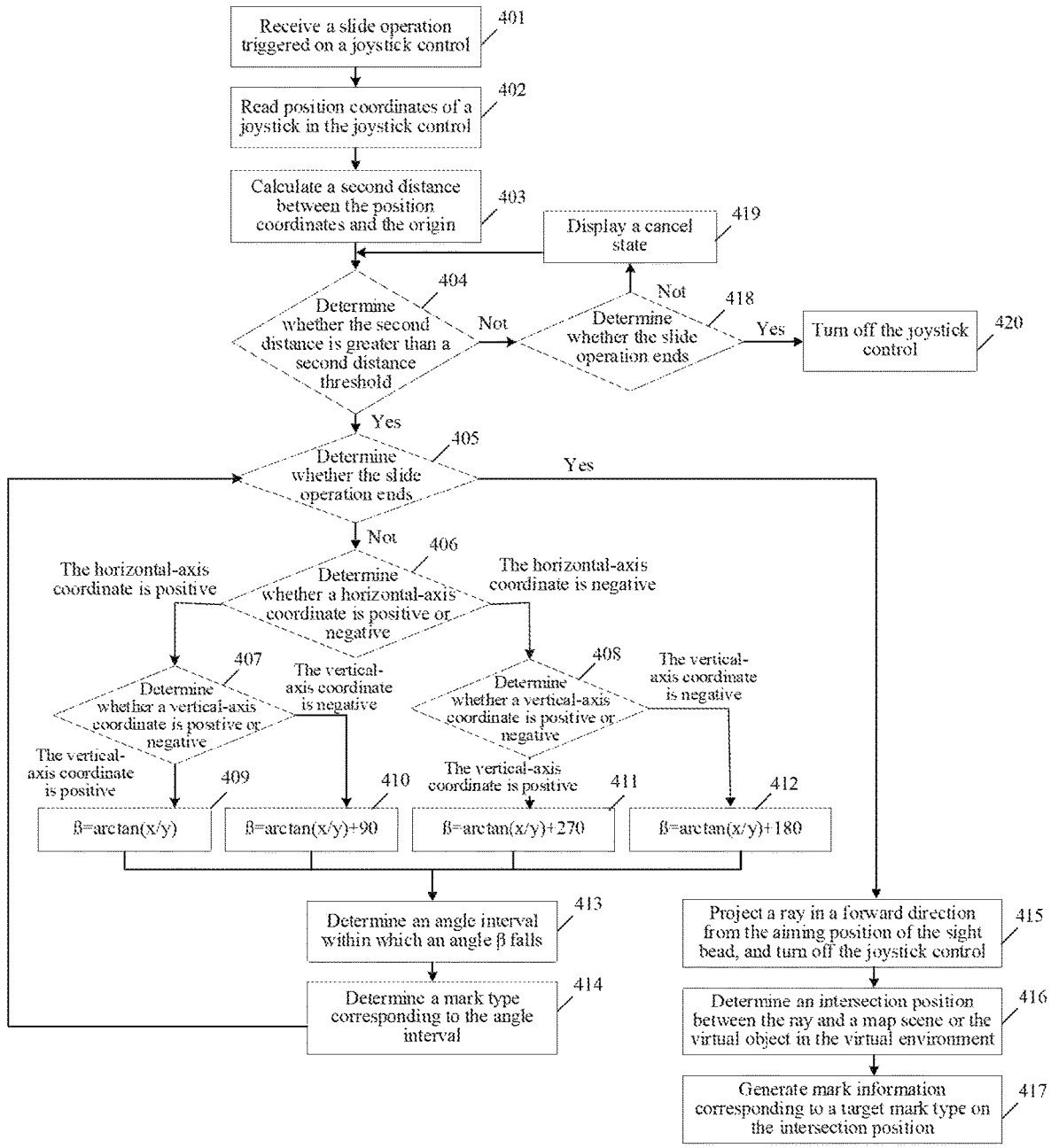
FIG. 10 is a flowchart of a method for generating mark information in a virtual environment according to another exemplary embodiment of this application.

Based on FIG. 2, a method for determining a mark type of the mark information is described by using an example in which the mark control is a joystick control, and the mark operation is a slide operation on the joystick control. The roulette option list includes four candidate mark types. As shown in FIG. 10, schematic steps are as follows:

In step 401, a slide operation triggered on a joystick control is received.

The terminal receives the slide operation triggered on the joystick control.

In step 402, position coordinates of a joystick in the joystick control are read.

Optionally, by using an example in which a slide region of the joystick control is circular, a rectangular coordinate system is established by using a center point of the slide region as the origin, and position coordinates (X, Y) of the joystick after being slid are read, that is, a horizontal coordinate is X, and a vertical coordinate is Y.

In step 403, a second distance between the position coordinates and the origin is calculated.

The terminal calculates the second distance L between the position coordinates (X, Y) and the origin, where a calculation formula is $L=\sqrt{X^2+Y^2}$.

In step 404, it is determined whether the second distance is greater than a second distance threshold.

The terminal determines whether the second distance L is greater than the second distance threshold R. As an exemplary description, a concentric circle is set inside the circular region corresponding to the slide region, and R is the radius of the concentric circle.

When L is greater than R, step 405 is performed; and when L is less than or equal to R, step 418 is performed.

In step 405, it is determined whether the slide operation ends.

The terminal determines whether the slide operation ends; when the slide operation does not end, the terminal performs step 406; and when the slide operation ends, the terminal performs step 415.

In step 406, it is determined whether a horizontal-axis coordinate is positive or negative.

The terminal determines whether the horizontal-axis coordinate in the position coordinates is positive or negative. When the horizontal coordinate X is positive, the terminal performs step 407. When the horizontal coordinate X is negative, the terminal performs step 408.

In step 407, it is determined whether a vertical-axis coordinate is positive or negative.

The terminal determines whether the vertical-axis coordinate in the position coordinates is positive or negative. When the vertical coordinate Y is positive, the terminal performs step 409. When the vertical coordinate Y is negative, the terminal performs step 410.

In step 408, it is determined whether a vertical-axis coordinate is positive or negative.

The terminal determines whether the vertical-axis coordinate in the position coordinates is positive or negative. When the vertical coordinate Y is positive, the terminal performs step 411. When the vertical coordinate Y is negative, the terminal performs step 412.

In step 409, the terminal calculates an angle $\beta$ according to a formula $\beta=\arctan(X/Y)$ when X is positive and Y is positive.

The angle $\beta$ is an included angle between the coordinates (X, Y) and a positive direction of the horizontal axis; and after calculating the angle $\beta$, the terminal performs step 413.

In step 410, the terminal calculates an angle $\beta$ according to a formula $\beta=\arctan(Y/X)+90$ when X is positive and Y is negative.

After calculating the angle $\beta$, the terminal performs step 413.

In step 411, the terminal calculates an angle $\beta$ according to a formula $\beta=\arctan(Y/X)+270$ when X is negative and Y is positive.

After calculating the angle $\beta$, the terminal performs step 413.

In step 412, the terminal calculates an angle $\beta$ according to a formula $\beta=\arctan(X/Y)+180$ when X is negative and Y is negative.

After calculating the angle $\beta$, the terminal performs step 413.

In step 413, an angle interval within which the angle $\beta$ falls is determined.

The terminal divides, according to the rectangular coordinate system and the angle $\beta$, a region in which L is greater than R in the circular region corresponding to the slide region into four angle intervals, which are angle intervals [0, 90), [90, 180), [180, 270) and [270, 360) respectively. [$Z_1$, $Z_2$) represents being greater than or equal to $Z_1$ and less than $Z_2$, both $Z_1$ and $Z_2$ being integers, $Z_1$ being less than $Z_2$.

Optionally, the rectangular coordinate system is divided into N angle intervals, which are angle intervals [0, 360/N), [360/N, 360×2/N), . . . , [360(N−1)/N, 360) respectively, N being a positive integer.

In step 414, a mark type corresponding to the angle interval is determined.

The foregoing four angle intervals correspond to four candidate mark types in the roulette option list respectively. The angle interval [0, 90) corresponds to a first candidate mark type, the angle interval [90, 180) corresponds to a second candidate mark type, the angle interval [180, 270) corresponds to a third candidate mark type, and the angle interval [270, 360) corresponds to a fourth candidate mark type.

When the angle interval within which the angle β falls is [0, 90), the first candidate mark type is determined as the target mark type. When the angle interval within which the angle β falls is [90, 180), the second candidate mark type is determined as the target mark type. When the angle interval within which the angle β falls is [180, 270), the third candidate mark type is determined as the target mark type. When the angle interval within which the angle β falls is [270, 360), the fourth candidate mark type is determined as the target mark type.

Optionally, the N angle intervals correspond to N candidate mark types in the roulette option list respectively.

After determining the mark type corresponding to the angle interval, the terminal performs step 405.

In step 415, a ray is projected in a forward direction from the aiming position of the sight bead, and the joystick control is turned off.

In step 416, an intersection position between the ray and a map scene or the virtual object in the virtual environment is determined.

In step 417, the mark information corresponding to the target mark type is generated on the intersection position.

In step 418, it is determined whether the slide operation ends.

The terminal determines whether the slide operation ends. When the slide operation does not end, the terminal performs step 419. When the slide operation ends, the terminal performs step 420.

In step 419, a cancel state is displayed.

For this step, refer to FIG. 6. Details are not described herein again.

In step 420, the joystick control is turned off.

Based on the above, according to the method for generating mark information in a virtual environment provided in this embodiment, by means of region division on the slide region of the joystick control, a quick operation for mark information of a plurality of mark types can be implemented, thereby improving the user operation experience.

The foregoing embodiment is based on a game application scenario, and the following is a brief description of an example of an embodiment of military simulation.

The simulation technology is a model technology in which a system behavior or process is reflected by using software and hardware through an experiment of simulating a real environment.

A military simulation program is a program specially constructed for military application by using simulation technology, which performs quantitative analysis on battle elements such as sea, air, and land, weapon equipment performance, battle actions, and the like, to accurately simulate a battlefield environment, and present a battlefield situation, thereby implementing battle system evaluation and decision aids.

For example, a user establishes a virtual battlefield on a terminal in which a military simulation program is located, and a battle is performed between groups. The user controls a virtual character in the virtual battlefield environment to perform at least one operation of walking, running, climbing, driving, shooting, throwing, detecting, close combat, and other actions in the virtual battlefield environment. The virtual battlefield environment includes at least one of the following forms: a plain, a mountain, a plateau, a basin, a desert, a river, a lake, a sea, vegetation, and a building. Virtual characters include a virtual person, a virtual animal, a cartoon person, and the like. Each virtual character has a shape and size in a 3D virtual environment, and occupies some space in the 3D virtual environment.

Based on the above situation, optionally, when needing to send a prompt to a teammate, the user may determine a target position on a target-perspective picture of the military simulation program, and marks corresponding mark information. For example, the user makes a material mark on a position of a material, to prompt the teammate that the material can be picked up here; or the user makes an enemy mark on an enemy, to prompt the teammate that the virtual character belongs to an enemy camp; or the user makes a caution mark in a dangerous region ahead, to prompt the teammate that it is dangerous ahead. For a method for generating mark information in a military scenario, refer to the foregoing scenario of generating mark information based on the game application scenario, and details are not described herein again.

It is to be understood that, although the steps in the flowcharts of FIG. 2, FIG. 6, FIG. 8, and FIG. 10 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least some of the steps in FIG. 2, FIG. 6, FIG. 8, and FIG. 10 may include a plurality of sub-steps or a plurality of stages. These sub-steps or stages are not necessarily performed at the same moment, but may be performed at different moments. These sub-steps or stages are not necessarily executed sequentially, but may be performed in turn or alternately with another step or at least some of sub-steps or stages of another step.

Figure 11:
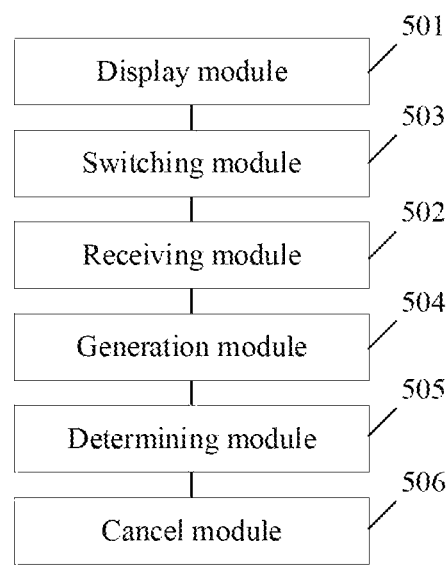
FIG. 11 is a schematic diagram of an apparatus for generating mark information in a virtual environment according to another exemplary embodiment of this application.

FIG. 11 shows an apparatus for generating mark information in a virtual environment according to an exemplary embodiment of this application. The apparatus may be implemented as a part or all of a terminal by using software, hardware (processing circuitry), or a combination thereof. The apparatus includes a display module 501, configured to display a target-perspective picture of an application, the target-perspective picture showing the virtual environment including a virtual character from a target perspective, a sight bead and a mark control being displayed in the target-perspective picture. The apparatus also includes receiving module 502, configured to receive a first-perspective switching operation, and a switching module 503, configured to change an observation direction of the target-perspective picture and an aiming position of the sight bead according to the first-perspective switching operation. The receiving module 502 is configured to receive a mark operation triggered on the mark control, and a generation module 504 is configured to generate, according to the mark operation, mark information on a virtual object to which the aiming position points.

In some embodiments, the mark control (mark control interface) is a joystick control (joystick control interface), and the mark operation includes a slide operation acting on the joystick control. The display module 501 is configured to superimpose and display a roulette option list on the target-perspective picture in response to a determination that the joystick control receives the slide operation, the roulette option list including at least two candidate mark types arranged along a roulette edge. A determining module 505 is configured to determine a target mark type from the at least two candidate mark types according to an end position of the slide operation, and the generation module 504 is configured to generate mark information corresponding to the target mark type on the virtual object to which the aiming position points.

In some embodiments, the at least two candidate mark types include at least two of the following types: a warning mark, a material mark, a go-forward mark, an attack mark, a retreat mark, a defense mark, a caution mark, and a neutral mark.

In some embodiments, the mark control is a joystick control, and the mark operation includes a slide operation acting on the joystick control.

In the apparatus, the display module 501 is configured to superimpose and display a roulette option list on the target-perspective picture in response to a determination that the joystick control receives the slide operation, the roulette option list including at least two candidate mark types arranged along a roulette edge and a central region; and the apparatus further includes: a cancel module 506, configured to cancel generation of the mark information in response to a determination that an end position of the slide operation is in the central region.

In some embodiments, the generation module 504 is configured to project a ray in a forward direction from the aiming position, determine an intersection position between the ray and a map scene or the virtual object in the virtual environment, and generate the mark information corresponding to the target mark type on the intersection position.

In some embodiments, the ray is not visible in the virtual environment; or the ray is a fully or partially visible ray in the virtual environment.

In some embodiments, in the apparatus, the receiving module 502 is configured to receive a second-perspective switching operation, and the switching module 503 is configured to aim the sight bead at existing mark information according to the second-perspective switching operation. The display module 501 is configured to superimpose and display a cancel control on the target-perspective picture in response to a determination that the sight bead is aimed at the existing mark information. The receiving module 502 is configured to receive a cancel operation triggered on the cancel control, and the display module 501 is configured to cancel displaying of the existing mark information according to the cancel operation.

Based on the above, by means of the apparatus for generating mark information in a virtual environment provided in this embodiment, a target-perspective picture of an application is displayed by the apparatus, a sight bead and a mark control being displayed in the target-perspective picture; a first-perspective switching operation is received. An observation direction of the target-perspective picture and an aiming position of the sight bead are changed according to the first-perspective switching operation. A mark operation triggered on the mark control is received, and mark information is generated, according to the mark operation, on a virtual object to which the aiming position points. The apparatus can generate the mark information on the virtual object without interrupting other operations on a virtual character, thereby improving human-computer interaction efficiency. In addition, the apparatus determines a position of the virtual object by using a ray emitted by the sight bead, so that marking on the virtual object is more accurate, and a long-distance virtual object can also be accurately marked. In addition, by means of the apparatus, one joystick control can be used to trigger marking of mark information of at least two mark types, so that it is unnecessary to set a plurality of mark controls, to avoid affecting control operations on a screen and avoid increasing an erroneous touch rate. It is unnecessary to unfold an option list to select a mark type of mark information, thereby implementing quick marking of mark information of different mark types, and improving human-computer interaction efficiency.

In addition, the apparatus further resolves a problem that mark information can only be used for marking geographic locations on a map, and cannot be used for marking in other dimensions, so that virtual objects such as virtual props in the virtual environment can be marked by using mark information.

In an embodiment, an electronic device is provided. The electronic device may be a terminal 600. For the internal structure of the terminal 600, refer to FIG. 12. The terminal 600 may be a smartphone, a tablet computer, a moving picture experts group audio layer III (MP3) player, a moving picture experts group audio layer IV (MP4) player, a notebook computer, or a desktop computer. The terminal 600 may alternatively be referred to as user equipment, a portable terminal, a laptop terminal, a desktop terminal, or the like.

Generally, the terminal 600 includes a processor 601 (processing circuitry) and a memory 602 (non-transitory computer-readable storage medium).

The processor 601 may include one or more processing cores, and may be, for example, a 4-core processor or an 8-core processor. The processor 601 may be implemented by using at least one hardware form of a digital signal processor (DSP), a field-programmable gate array (FPGA), and a programmable logic array (PLA). The processor 601 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 601 may be integrated with a graphics processing unit (GPU). The GPU is configured to render and draw content that needs to be displayed on a display screen. In some embodiments, the processor 601 may further include an artificial intelligence (AI) processor. The AI processor is configured to process a computing operation related to machine learning.

The memory 602 may include one or more computer-readable storage media that may be non-transitory. The memory 602 may further include a high-speed random access memory (RAM) and a non-volatile memory, for example, one or more disk storage devices or flash memory devices. In some embodiments, a non-transitory computer-readable storage medium in the memory 602 is configured to store at least one instruction, the at least one instruction being configured to be executed by the processor 601 to implement the method for generating mark information in a virtual environment provided in the method embodiments of this application.

In some embodiments, the terminal 600 may optionally include: a peripheral device interface 603 and at least one peripheral device. The processor 601, the memory 602, and the peripheral device interface 603 may be connected by using a bus or a signal cable. Each peripheral device may be connected to the peripheral device interface 603 by using a bus, a signal cable, or a circuit board. Specifically, the peripheral device includes: at least one of a radio frequency (RF) circuit 604, a touch display screen 605, a camera component 606, an audio circuit 607, a positioning component 608, and a power supply 609.

The peripheral device interface 603 may be configured to connect the at least one peripheral device related to input/output (I/O) to the processor 601 and the memory 602. In some embodiments, the processor 601, the memory 602, and the peripheral device interface 603 are integrated on the same chip or circuit board. In some other embodiments, any one or two of the processor 601, the memory 602, and the peripheral device interface 603 may be implemented on a separate chip or circuit board, which is not limited in this embodiment.

The RF circuit 604 is configured to receive and transmit an RF signal, which is also referred to as an electromagnetic signal.

The display screen 605 is configured to display a user interface (UI). The UI may include a graph, text, an icon, a video, and any combination thereof.

The camera component 606 is configured to capture an image or a video. Optionally, the camera component 606 includes a front-facing camera and a rear-facing camera.

The audio circuit 607 may include a microphone and a speaker. The microphone is configured to collect sound waves of a user and an environment, and convert the sound waves into electric signals and input the electric signals into the processor 601 for processing, or input the electric signals into the RF circuit 604 to implement speech communication.

The positioning component 608 is configured to position a current geographic location of the terminal 600, to implement navigation or a location based service (LBS).

The power supply 609 is configured to supply power to components in the terminal 600. The power supply 609 may be an alternating current, a direct current, a primary battery, or a rechargeable battery.

In some embodiments, the terminal 600 further includes one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 may detect a magnitude of acceleration on three coordinate axes of a coordinate system established with the terminal 600.

The gyroscope sensor 612 may detect a body direction and a rotation angle of the terminal 600. The gyroscope sensor 612 may work with the acceleration sensor 611 to acquire a 3D action performed by the user on the terminal 600.

The pressure sensor 613 may be disposed at a side frame of the terminal 600 and/or a lower layer of the touch display screen 605. When the pressure sensor 613 is disposed at the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the low layer of the touch display screen 605, the processor 601 controls, according to a pressure operation of the user on the display screen 605, an operable control on the UI. The operable control includes at least one of a button control, a scroll bar control, an icon control and a menu control.

The fingerprint sensor 614 is configured to collect a fingerprint of a user, and the processor 601 recognizes an identity of the user according to the fingerprint collected by the fingerprint sensor 614, or the fingerprint sensor 614 recognizes the identity of the user based on the collected fingerprint. In a case that the identity of the user is recognized as credible, the processor 601 authorizes the user to perform a related sensitive operation. The sensitive operation includes screen unlocking, viewing of encrypted information, software downloading, payment, setting changing, or the like. The fingerprint sensor 614 may be disposed on a front face, a back face, or a side face of the terminal 600. When a physical button or a vendor logo is disposed on the terminal 600, the fingerprint sensor 614 may be integrated together with the physical button or the vendor logo.

The optical sensor 615 is configured to collect ambient light intensity. In an embodiment, the processor 601 may control display brightness of the touch display screen 605 according to the ambient light intensity collected by the optical sensor 615. Specifically, when the ambient light intensity is relatively high, the display brightness of the touch display screen 605 is increased. When the ambient light intensity is relatively low, the display brightness of the touch display screen 605 is reduced. In another embodiment, the processor 601 may further dynamically adjust a photographing parameter of the camera component 606 according to the ambient light intensity collected by the optical sensor 615.

The proximity sensor 616, also referred to as a distance sensor, is generally disposed on the front panel of the terminal 600. The proximity sensor 616 is configured to collect a distance between the user and the front surface of the terminal 600. In an embodiment, when the proximity sensor 616 detects that the distance between the user and the front surface of the terminal 600 gradually becomes smaller, the touch display screen 605 is controlled by the processor 601 to switch from a screen-on state to a screen-off state. In a case that the proximity sensor 616 detects that the distance between the user and the front surface of the terminal 600 gradually becomes larger, the touch display screen 605 is controlled by the processor 601 to switch from the screen-off state to the screen-on state.

Figure 12:
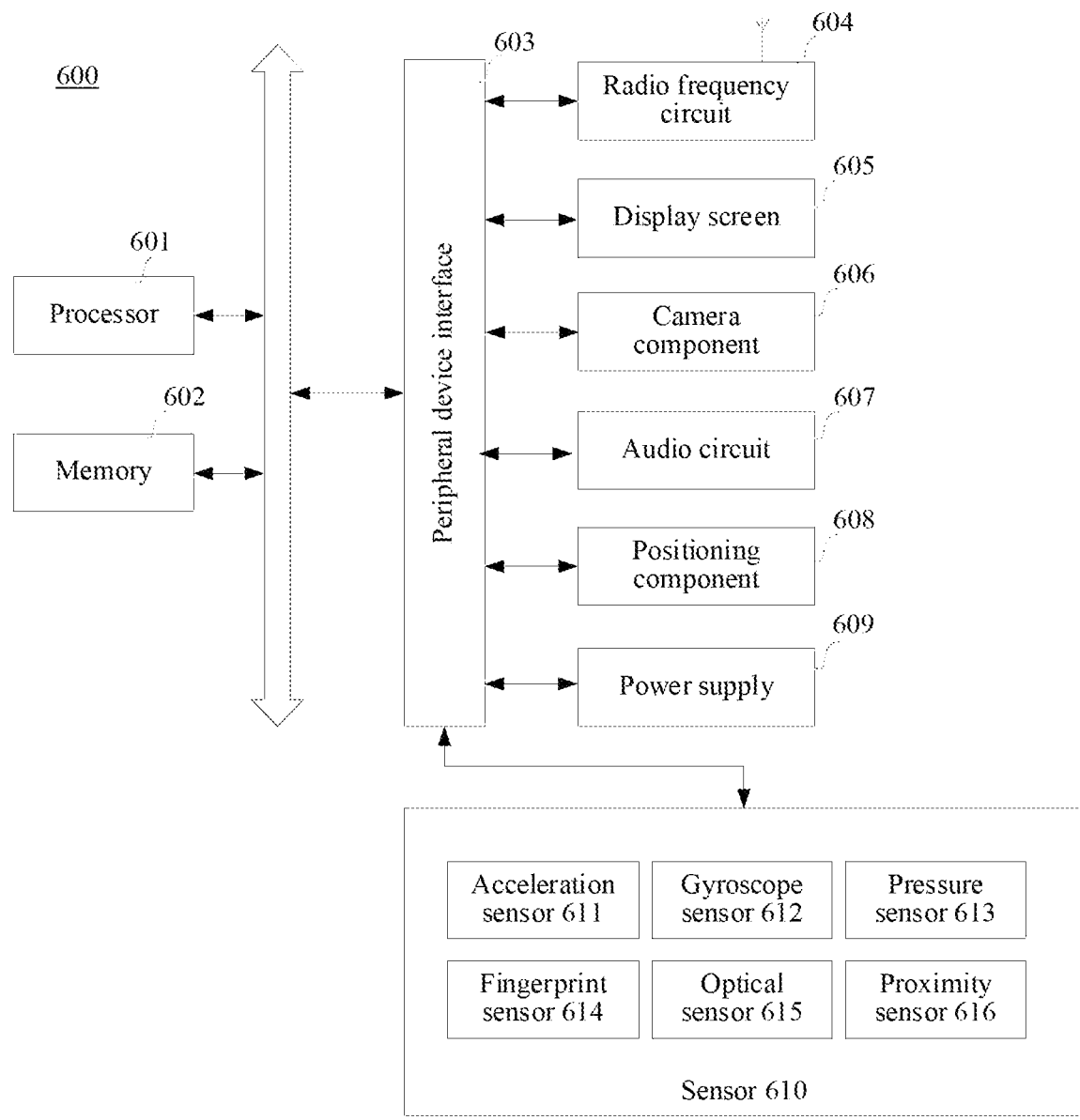
FIG. 12 is a schematic structural diagram of a terminal according to an exemplary embodiment of this application.

A person skilled in the art may understand that the structure shown in FIG. 12 does not constitute a limitation to the terminal 600, and the terminal may include more components or fewer components than those shown in the figure, or some components may be combined, or a different component deployment may be used.

Figure 13:
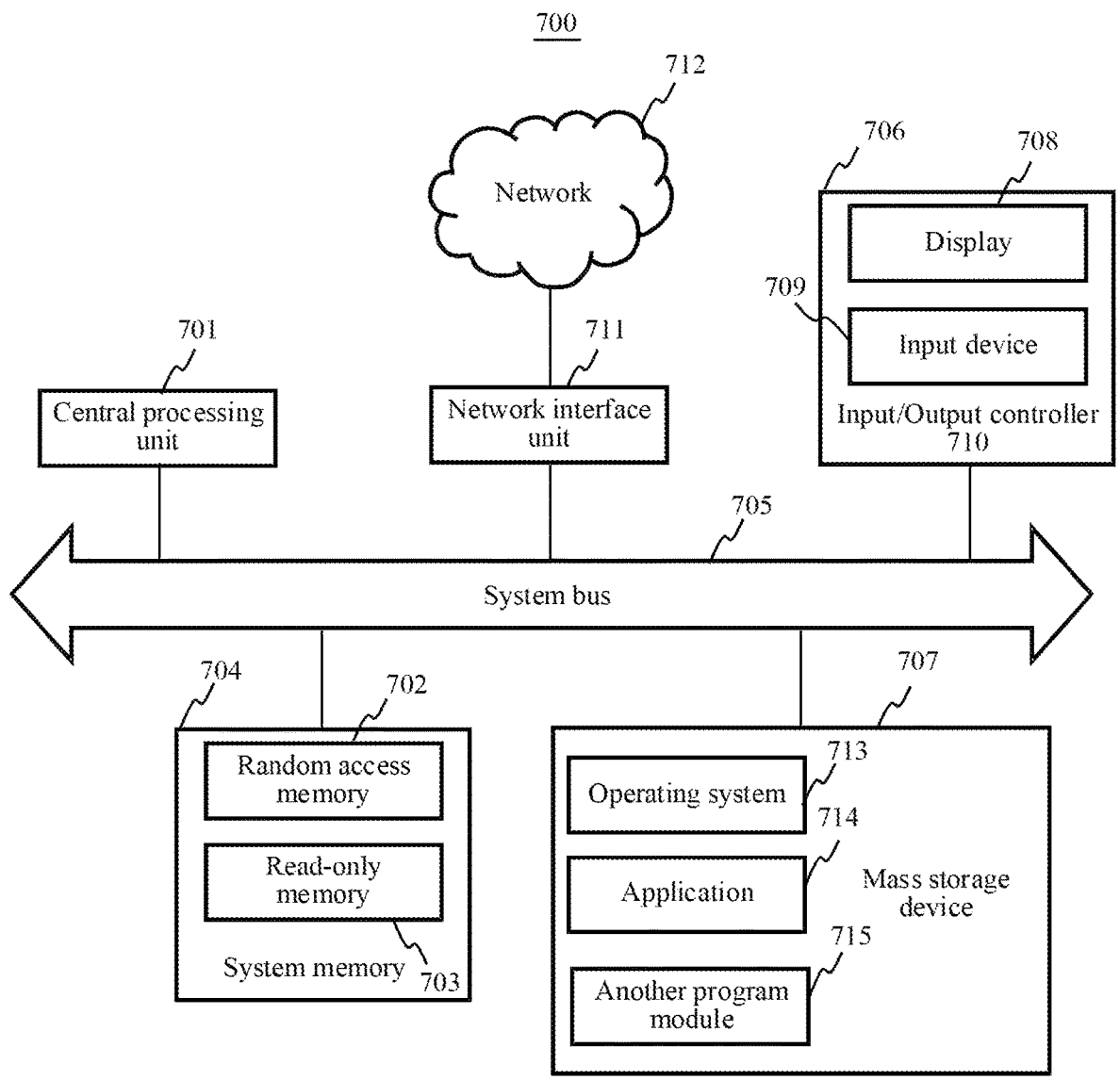
FIG. 13 is a schematic structural diagram of a server according to an exemplary embodiment of this application.

In an embodiment, another electronic device is provided. The electronic device may be a server 700. For the internal structure of the server 700, refer to FIG. 13. The server 700 may be configured to implement the method for generating mark information in a virtual environment provided in the foregoing embodiments. Specifically, the server 700 includes a CPU 701, a system memory 704 including a RAM 702 and a read-only memory (ROM) 703, and a system bus 705 connecting the system memory 704 and the CPU 701. The server 700 further includes a basic I/O system 706 for transmitting information between components in a computer, and a mass storage device 707 used for storing an operating system 713, an application 714, and another program module 715.

The basic I/O system 706 includes a display 708 configured to display information and an input device 709 such as a mouse or a keyboard that is configured to input information by a user. The display 708 and the input device 709 are both connected to the CPU 701 by using an I/O controller 710 connected to the system bus 705. The basic I/O system 706 may further include the input/output controller 710, to receive and process inputs from a plurality of other devices, such as the keyboard, the mouse, or an electronic stylus. Similarly, the input/output controller 710 further provides an output to a display screen, a printer, or another type of output device.

The mass storage device 707 (non-transitory computer-readable storage medium) is connected to the CPU 701 (processing circuitry) by using a mass storage controller (not shown) connected to the system bus 705. The mass storage device 707 and an associated computer-readable medium provide non-volatile storage for the server 700. That is, the mass storage device 707 may include a computer-readable medium (not shown), such as a hard disk or a CD-ROM drive.

In general, the computer-readable medium may include a computer storage medium and a communications medium. The computer-storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 704 and the mass storage device 707 may be collectively referred to as a memory.

According to the embodiments of this application, the server 700 may further be connected, by using a network such as the Internet, to a remote computer on the network and run. That is, the server 700 may be connected to a network 712 by using a network interface unit 711 connected to the system bus 705, or may be connected to another type of network or a remote computer system (not shown) by using the network interface unit 711.

A person of ordinary skill in the art may understand that all or some of the steps of the methods in the foregoing embodiments may be implemented by a program instructing relevant hardware. The program may be stored in a non-transitory computer-readable storage medium. The computer-readable storage medium may be the computer-readable storage medium included in the memory in the foregoing embodiment, or may be a computer-readable storage medium that exists independently and that is not installed in a terminal. The computer-readable storage medium stores at least one instruction, at least one program, a code set or an instruction set, the at least one instruction, the at least one program, the code set or the instruction set being loaded and executed by a processor to implement the method for generating mark information in a virtual environment according to any one of FIG. 2 to FIG. 10.

Optionally, the computer-readable storage medium may include a ROM, a programmable ROM (PROM), an EPROM, an EEPROM or a flash memory. The volatile memory may include a RAM or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM). The sequence numbers of the foregoing embodiments of this application are merely for description purposes, and are not intended to indicate the preference among the embodiments.

A person of ordinary skill in the art may understand that all or some of the steps of the foregoing embodiments may be implemented by hardware, or may be implemented by a program instructing related hardware. The program may be stored in a computer-readable storage medium. The storage medium may be: a ROM, a magnetic disk, or an optical disc.

Technical features of the foregoing embodiments may be combined. To maintain conciseness, not all possible combinations of the technical features in the foregoing embodiments are described. However, the combinations of these technical features shall be considered as falling within the scope recorded by this specification provided that no conflict exists. The foregoing embodiments describe exemplary implementations of this application specifically and in detail, but cannot be construed as a limitation to the patent scope of this application. For a person of ordinary skill in the art, several modifications can be made without departing from the idea of this application, which all fall within the protection scope of this application. Therefore, the protection scope of this application is subject to the protection scope of the appended claims.

What is claimed is:

1. A method for generating mark information in a virtual environment, the method comprising:
displaying a target-perspective picture showing the virtual environment from a perspective of a virtual character, a sight bead pointing to an aiming position in the virtual environment, and a mark control interface being displayed in the target-perspective picture;
receiving a mark operation triggered on the mark control interface; and
in response to receiving the mark operation, generating, by processing circuitry of an electronic device, according to the received mark operation, mark information on a virtual object to which the aiming position points and on which the sight bead is displayed,
wherein the virtual object on which the mark information is generated is a movable object, a virtual prop, a virtual building, or a virtual landscape object in the virtual environment, and
wherein the generating includes determining an intersection position between a ray projected toward the aiming position and a location of the virtual object and displaying the generated mark information at the determined intersection position such that the generated mark information is visible at the location of the virtual object in the virtual environment to one or more teammates of the virtual character.

2. The method according to claim 1, wherein
the mark control interface is a joystick control interface, and the mark operation comprises a slide operation acting on the joystick control interface; and
the method further comprises:
displaying a plurality of candidate mark types by superimposing and displaying a roulette option list on the target-perspective picture in response to a determination that the joystick control interface receives the slide operation, the roulette option list comprising at least two candidate mark types arranged along a roulette edge; and
receiving a selected mark type from the plurality of candidate mark types according to an end position of the slide operation.

3. The method according to claim 2, wherein the plurality of candidate mark types comprise at least two of the following types:
a warning mark, a material mark, a go-forward mark, an attack mark, a retreat mark, a defense mark, a caution mark, and a neutral mark.

4. The method according to claim 1, further comprising:
after the generating the mark information on the virtual object, removing the mark information from the virtual object in response to user input.

5. The method according to claim 1, wherein the target-perspective picture includes the virtual character and shows the virtual environment from the perspective of the virtual character.

6. The method according to claim 1, wherein, after the generating, the method further comprises:
receiving a perspective switching operation;
aiming the sight bead at existing mark information according to the perspective switching operation;
superimposing and displaying a cancel control interface on the target-perspective picture in response to a determination that the sight bead is aimed at the existing mark information;
receiving a cancel operation triggered on the cancel control interface; and
cancelling displaying of the existing mark information according to the cancel operation.

7. The method according to claim 6, wherein the method further comprises:
adjusting the aiming position aimed at by the sight bead according to the perspective switching operation; and
calculating a first distance between the adjusted aiming position and a marked position corresponding to the existing mark information; and
the superimposing and displaying the cancel control interface comprises:
superimposing and displaying the cancel control interface on the target-perspective picture in response to a determination that the first distance is less than a first distance threshold.

8. The method according to claim 6, wherein the existing mark information comprises mark information marked by the virtual character or mark information marked by a teammate of the virtual character.

9. The method according to claim 1, further comprising:
receiving an attack operation different from the mark operation, and
in response to the attack operation, controlling the virtual character to launch an attack toward the aiming position of the sight bead.

10. An apparatus for generating mark information in a virtual environment, comprising:
processing circuitry configured to
control display of a target-perspective picture showing the virtual environment from a perspective of a virtual character, a sight bead pointing to an aiming position in the virtual environment, and a mark control interface being displayed in the target-perspective picture;
receive a mark operation triggered on the mark control interface; and
in response to receiving the mark operation, generate, according to the received mark operation, mark information on a virtual object to which the aiming position points and on which the sight bead is displayed,
wherein the virtual object on which the mark information is generated is a movable object, a virtual prop, a virtual building, or a virtual landscape object in the virtual environment, and
wherein the generating includes determining an intersection position between a ray projected toward the aiming position and a location of the virtual object and displaying the generated mark information at the determined intersection position such that the generated mark information is visible at the location of the virtual object in the virtual environment to one or more teammates of the virtual character.

11. The apparatus according to claim 10, wherein the mark control interface is a joystick control interface, and the mark operation comprises a slide operation acting on the joystick control interface; and
the processing circuitry is further configured to
superimpose and display a roulette option list on the target-perspective picture in response to a determination that the joystick control interface receives the slide operation, the roulette option list comprising at least two candidate mark types arranged along a roulette edge;
determine a selected mark type from the at least two candidate mark types according to an end position of the slide operation; and
generate the mark information corresponding to the selected mark type on the virtual object to which the aiming position points.

12. The apparatus according to claim 11, wherein the at least two candidate mark types comprise at least two of the following types:
a warning mark, a material mark, a go-forward mark, an attack mark, a retreat mark, a defense mark, a caution mark, and a neutral mark.

13. The apparatus according to claim 10, wherein
the processing circuitry is further configured to
after generating the mark information on the virtual object, removing the mark information from the virtual object in response to user input.

14. The apparatus according to claim 10, wherein the processing circuitry is further configured to:
receive a perspective switching operation;
aim the sight bead at existing mark information according to the perspective switching operation;
superimpose and display a cancel control interface on the target-perspective picture in response to a determination that the sight bead is aimed at the existing mark information;
receive a cancel operation triggered on the cancel control interface; and
cancel displaying of the existing mark information according to the cancel operation.

15. The apparatus according to claim 10, wherein the processing circuitry is further configured to
receive an attack operation different from the mark operation, and
in response to the attack operation, control the virtual character to launch an attack toward the aiming position of the sight bead.

16. A computer-readable storage medium, storing instructions, which, when executed by a processor, cause the processor to perform:
displaying a target-perspective picture showing a virtual environment from a perspective of a virtual character, a sight bead pointing to an aiming position in the virtual environment, and a mark control interface being displayed in the target-perspective picture;
receiving a mark operation triggered on the mark control interface; and
in response to receiving the mark operation, generating, according to the received mark operation, mark information on a virtual object to which the aiming position points and on which the sight bead is displayed, wherein the virtual object on which the mark information is generated is a movable object, a virtual prop, a virtual building, or a virtual landscape object in the virtual environment, and wherein the generating includes determining an intersection position between a ray projected toward the aiming position and a location of the virtual object and displaying the generated mark information at the determined intersection position such that the generated mark information is visible at the location of the virtual object in the virtual environment to one or more teammates of the virtual character.

17. The computer-readable storage medium according to claim 16, wherein the mark control interface is a joystick control interface, and the mark operation comprises a slide operation acting on the joystick control interface; and the stored instructions cause the processor to perform:

displaying a plurality of candidate mark types by superimposing and displaying a roulette option list on the target-perspective picture in response to a determination that the joystick control interface receives the slide operation, the roulette option list comprising at least two candidate mark types arranged along a roulette edge; and receiving a selected mark type from the plurality of candidate mark types according to an end position of the slide operation.

18. The computer-readable storage medium according to claim 17, wherein the plurality of candidate mark types comprise at least two of the following types:

a warning mark, a material mark, a go-forward mark, an attack mark, a retreat mark, a defense mark, a caution mark, and a neutral mark.

* * * * *

UNITED STATES PATENT AND TRADEMARK OFFICE
CERTIFICATE OF CORRECTION

PATENT NO. : 12,111,979 B2
APPLICATION NO. : 18/183531
DATED : October 8, 2024
INVENTOR(S) : Junxiang Wang Page 1 of 1

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Twenty-sixth Day of November, 2024

Katherine Kelly Vidal
*Director of the United States Patent and Trademark Office*